Feb. 13, 1940. D. LOVE 2,190,075
LOCOMOTIVE WEDGE BOLT NUT LOCK DEVICE
Filed May 5, 1938
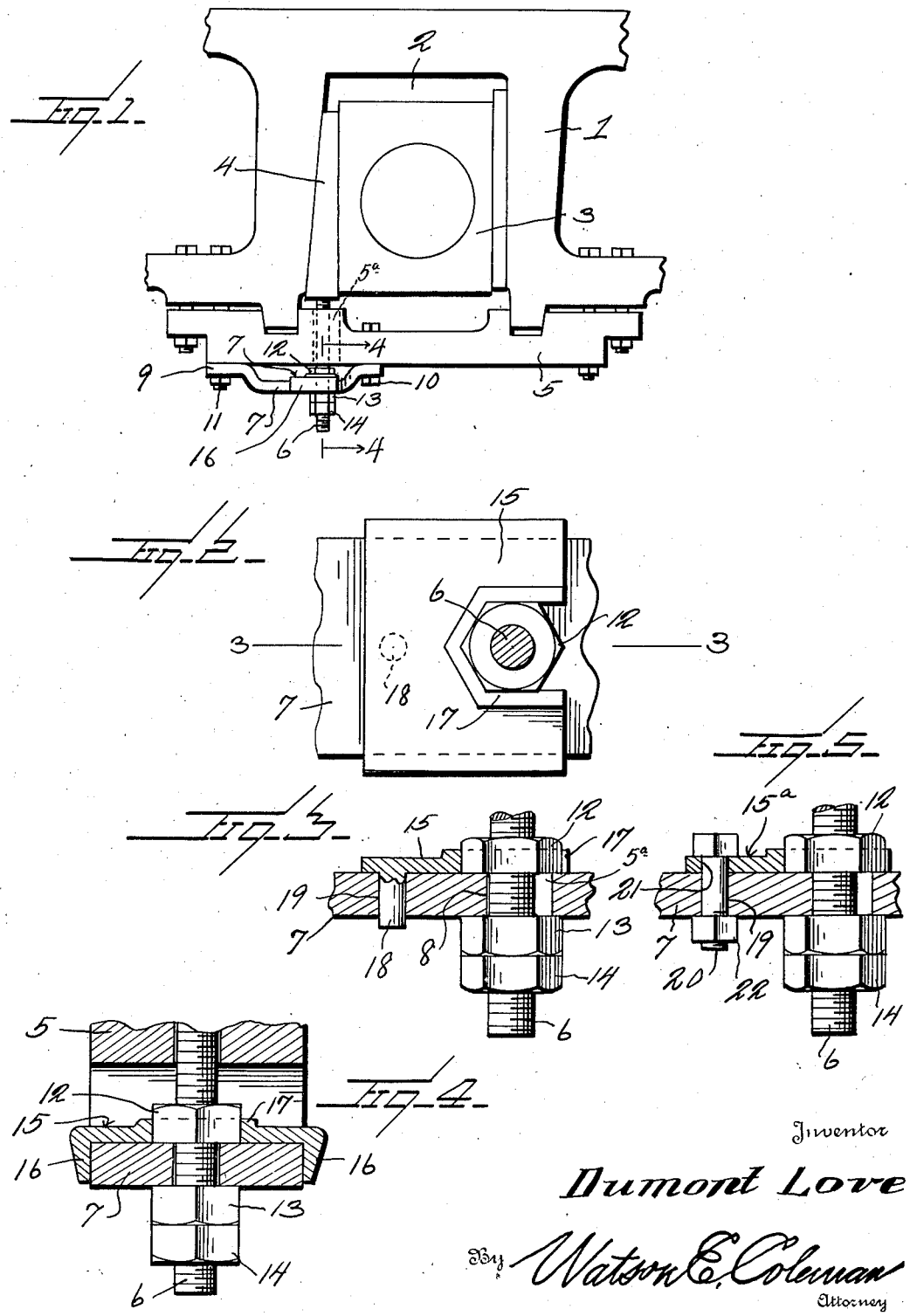
Inventor
Dumont Love
By Watson E. Coleman
Attorney Patented Feb. 13, 1940

2,190,075

UNITED STATES PATENT OFFICE 2,190,075

LOCOMOTIVE WEDGE BOLT NUT LOCK DEVICE

Dumont Love, St. Augustine, Fla.

Application May 5, 1938, Serial No. 206,286

1 Claim. (Cl. 151—57)

This invention relates to improvements in nut locks and pertains particularly to locking means for wedge bolt nuts of locomotives.

The present invention has for its primary object to provide an improved nut lock for bolts employed in locomotives for maintaining the driving box wedge in position whereby the severe vibrations encountered by the engine structure in road service will be ineffective to loosen the nut and the driving box wedge.

Another object of the invention is to provide an improved nut locking means for the specific use above referred to which will be effective and does not require any mutilation of the wedge bolt nut in order that the locking means may be connected therewith.

Still another object of the invention is to provide an improved wedge bolt nut lock securing means which may be installed or removed in a minimum of time and without requiring the use of tools other than a wrench.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claim.

In the drawing—

Figure 1 is a view in elevation of a portion of a locomotive frame showing the application thereto of the nut lock securing device embodying the present invention, the frame having mounted therein the driving box and securing wedge.

Figure 2 is a view in plan of one form of the nut lock securing means.

Figure 3 is a sectional view on the line 3—3 of Figure 2.

Figure 4 is a sectional view on the line 4—4 of Figure 1.

Figure 5 is a sectional view through a modified form of the nut lock securing means, the section being on a line corresponding to the section for Figure 3.

Referring now more specifically to the drawing, the numeral 1 generally designates a portion of a locomotive frame having the area 2 for the reception of a driving box 3. Such boxes are secured in position by means of a wedge 4 interposed between a side of the box and an inclined wall of the open area 2, in the manner illustrated and the lower part of the frame has secured thereto the plate 5 which extends across the opening 2 and has a slot 5a through which passes a bolt 6, the upper end of which bolt is securely fastened to the bottom edge of the wedge 4 to maintain the same tightly in position so as to prevent longitudinal movement of the box 3.

The lower face of the plate 5 has an auxiliary plate 7 extending longitudinally thereof across the area through which the bolt 6 passes, this auxiliary plate having an opening 8 for the bolt 6 and having its ends offset as indicated at 9, and secured to the plate by the bolts 10 and 11. The offset ends 9 of the auxiliary plate 7 thus serve to separate the major portion of this plate from the plate 5 providing an area between the two plates for a locking nut 12 which is threaded upon the bolt 6 and bears against the top of the plate 7. Beneath the auxiliary plate 7 are the securing and locking nuts 13 and 14 respectively, which are threaded upon the bolt, the securing nut engaging the bottom side of the plate 7 and the nut 14 serving to lock the securing nut against movement.

While the securing nut 13 is effectively held in place by the nut 14, the upper locking nut 12 will work loose as a result of the vibration to which the same is subjected and the present invention which is designed to maintain this nut in position consists of a plate 15 adapted to straddle the frame supported plate 7 and engage the opposite edge flanges 16 across the longitudinal side edges of the plate 7, in the manner shown in Figure 4. This nut securing plate 15 is provided in one of the edges which extends across the plate 7 with a recess 17, of a width to receive the lock nut 12 and shaped at its inner end to conform to the configuration of the lock nut, as shown in Figure 2. Thus, it will be seen that when the securing plate 15 is placed in straddling position across the plate 7 and is shifted so as to bring the lock nut 12 into the recess 17, the lock nut cannot turn. In order to maintain the securing plate against movement longitudinally on the plate 7, it is provided with an attaching means designed to penetrate the plate 7, as shown in Figures 3 and 5. One form of such attaching means, as illustrated in Figure 3, may consist of a stud 18 formed integrally with the securing plate 15 to extend downwardly therefrom through an opening 19 in the plate 7, while another form may consist in a bolt 20 passed through an aperture 21 in the form of a lock nut securing plate, shown in Figure 5 and designated generally by the numeral 15a. This bolt 20 will extend through the opening 19 of the plate 7 and when the usual nut 22 is placed thereon and drawn up into position it will maintain the plate 15 firmly against movement longitudinally of the plate 7.

From the foregoing, it will be readily apparent that with the nut lock securing device herein disclosed, the nut 12 will be effectively maintained against rotation after the wedge bolt 6 has been set and it will also be readily apparent that when a change in setting is necessary or the wedge bolt has to be removed, such removal can be quickly effected without interference from the lock nut securing device.

What is claimed is:

In locomotive running gear, a wedge bolt, a pair of superposed spaced plates through which said bolt passes, a nut threaded on the bolt between the plates, a holding means for said nut comprising a plate resting upon the under one of said first plates and having an edge recess of polygonal outline to conform to the outline of and snugly receive said nut, flanges formed along opposite edges of said last plate spaced to snugly receive therebetween the said under one of the first plates, and a pin coupling the recessed plate and the said under plate together.

DUMONT LOVE.